March 17, 1931. P. H. GRANGER 1,796,454
APPARATUS FOR LOCATING LEAKS
Filed June 26, 1928 2 Sheets-Sheet 1
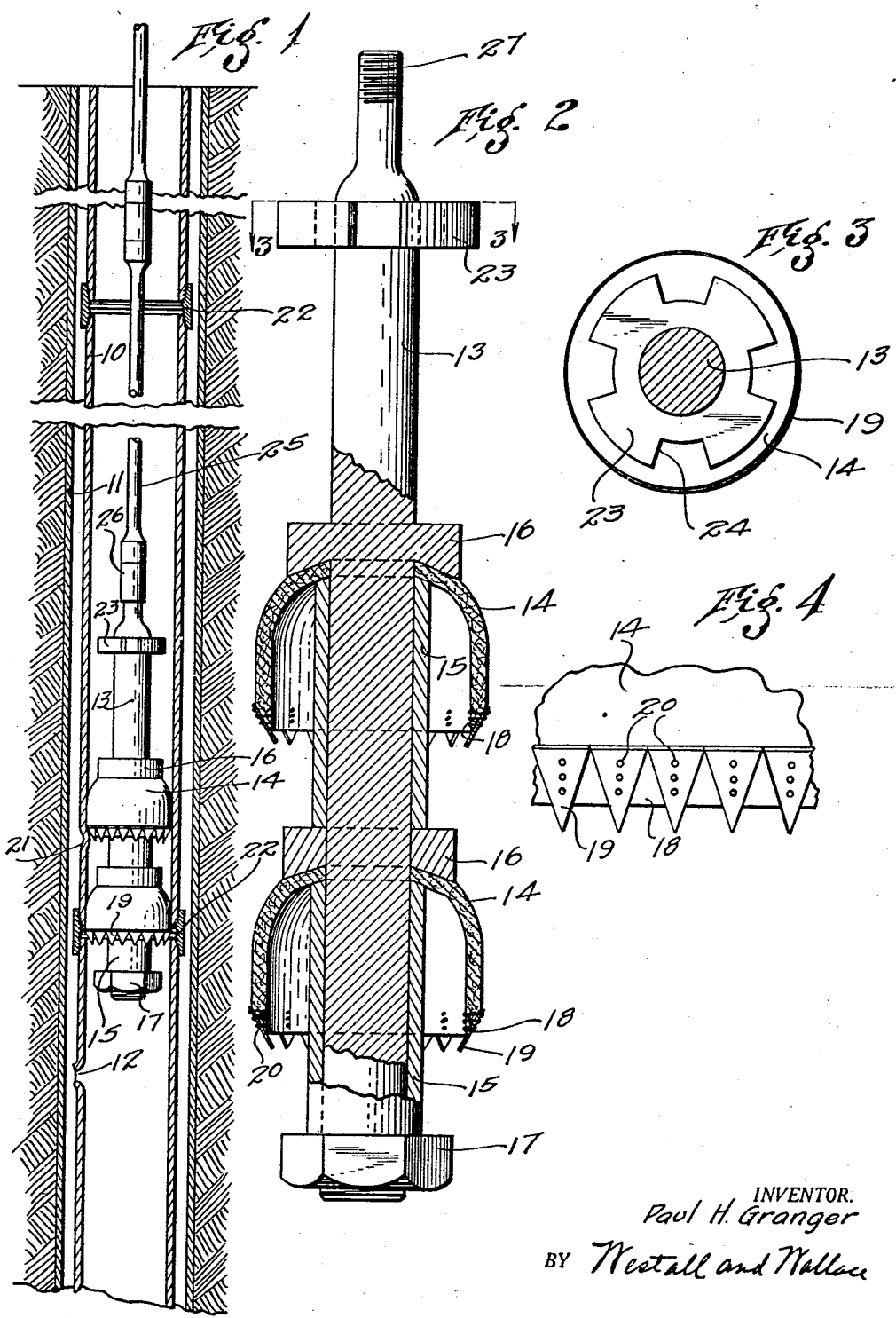
INVENTOR.
Paul H. Granger
BY Westall and Wallace
ATTORNEYS

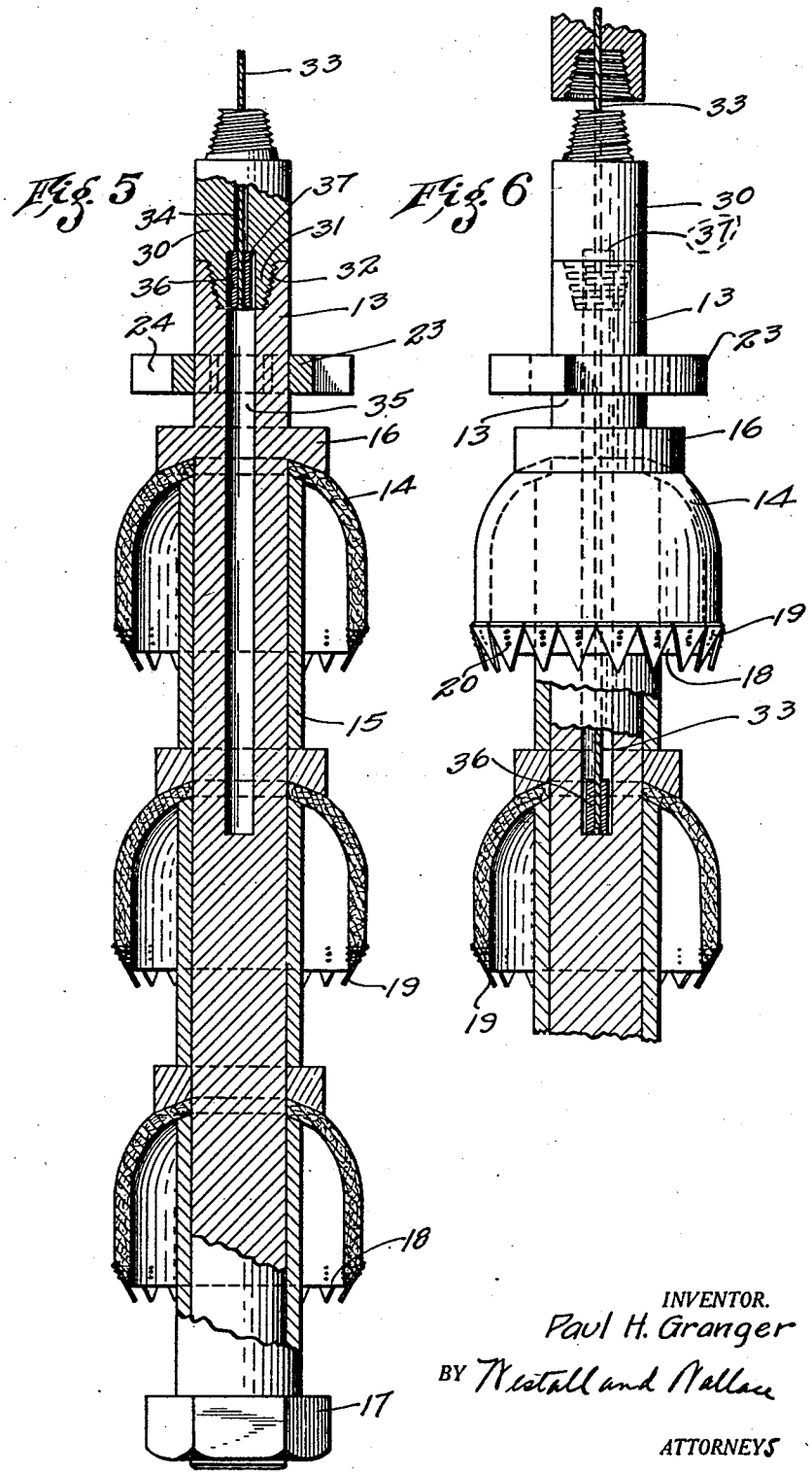

Patented Mar. 17, 1931

1,796,454

UNITED STATES PATENT OFFICE

PAUL H. GRANGER, OF LOS ANGELES, CALIFORNIA

APPARATUS FOR LOCATING LEAKS

Application filed June 26, 1928. Serial No. 288,519.

This invention relates to apparatus for locating leaks in well piping and the like while in the well hole and under normal conditions of pressure, and it is an object of the invention to provide improved means for lowering an indicator in a well pipe or tubing past any obstruction in its bore, until the indicator is arrested by an incompressible column of fluid standing in the pipe to the level of a leak which is known to exist, so that measuring the distance to which the indicator has descended to its arrested position will accurately locate the leak.

More particularly it is an object of the invention to provide for positively lowering the indicator, as for example by a string of sucker rods, so that it may be forced past any obstructions in the bore of the well pipe such as may be caused by indentations to insure the indicator reaching exactly the level of the leak which is to be located.

It is another object of the invention to provide the indicator with packing means adapted to form a fluid tight sliding fit so that the incompressible column of fluid standing in the well piping is prevented from leaking past the indicator, the packing being preferably so arranged as to form an improved guiding means for preventing the packing catching in the joints of the well piping and insuring the packing moving readily past any indentations or other obstructions in the bore of the piping. The guide for the packing is preferably also so constructed as to provide an improved wear-resisting contact surface engaging the bore of the piping for preventing the packing being damaged during its travel, with said wear-resisting contact surface preferably adapted to readily locally yield for passing any obstruction.

It is still another object of the invention to provide positive actuating means such as a string of sucker rods for lowering the indicator, with said positive actuating means if desired having a lost motion connection with the indicator whereby the latter may be lowered by its own weight and without operative engagegment by the actuating means until such time as it is arrested by an obstruction in the piping or by meeting the column of incompressible fluid which is maintained in the piping to a point above the level of the leak, whereupon the positive actuating means is adapted to be moved into engagement with the indicator for forcing it past any such obstruction and further lowering the indicator so as to force the incompressible column of fluid outwardly through the leak until the indicator is finally arrested by that portion of the column of fluid standing in the well piping to the level of the leak.

These objects together with further objects which will hereinafter appear, may be obtained by the embodiments of the invention illustrated in the accompanying drawings, in which:—

Fig. 1 is a vertical section through a well showing the leak indicator in side elevation and descending to operative position; Fig. 2 is a side elevation of the leak indicator, partly in axial section; Fig. 3 is a transverse section on the line 3—3 of Fig. 2; Fig. 4 is a fragmentary side elevation of one of the packing cups for the indicator; Fig. 5 is a view similar to Fig. 2 but showing a modified construction with the parts in the position they assume before engagement of the indicator by a positive actuating means; and Fig. 6 is a similar fragmentary view with the indicator engaged by a positive actuating means.

The indicator, which may be employed in tubing, casing, or other well piping, is shown in the drawings as adapted to locate a leak in well tubing 10 which is received in usual well casing 11. When a leak occurs in the tubing, as evidenced for example by a decrease in the results of the pumping action, the usual string of sucker rods is withdrawn and the lower end of the tubing is maintained closed, as for example by leaving the usual standing valve in position, and a column of fluid is maintained in the tubing to a point above the level of the leak which is indicated at 12 and through which the column of fluid will slowly escape so that it is gradually lowered to the level of the leak. Before the column of fluid has been lowered to the level of the leak the plug or closure means which forms the indicator is lowered in the tubing until it rests upon the column of fluid.

The indicator preferably comprises a mandrel 13 provided with external packing means adapted to slide in the well tubing and expansible by the incompressible column of fluid in the tubing so as to form a fluid tight plug or closure means. The packing may comprise a series of cups 14, preferably of leather or other suitable flexible material pressed into desired cup or bowl shape; and suitably spaced apart on the mandrel, as for example by sleeves 15 and cup followers 16 adapted to clamp against the central portions of the packing cups. The parts may be maintained in assembled relation by permanently fixing the uppermost follower 16 to the mandrel 13 and threading a nut 17 onto the lower end of the mandrel against the lowermost spacer sleeve 15.

The packing cups are shown as opening downwardly, and are preferably outwardly flared so as to normally approximately engage the wall of tubing 10 at their greatest diameter, and beyond said greatest diameter the free edges of the cups preferably taper inwardly to form contracted lips 18 which are so inclined as to insure the cups moving downwardly through the tubing without catching in the joints or being held by obstructions such as may result from irregularities or indentations in the tubing.

The ends of the cups may be guarded by a wear resisting means, which is preferably so arranged as to assist in guiding the edges of the cups past obstructions in the bore of the tubing and may be also adapted to locally yield for passing any appreciable obstruction. As an instance of this arrangement the guiding means is shown as a plurality of tapering wear resisting elements 19 of metal or the like suitably fixed to the exterior surfaces of lips 18, as by rivets 20, with the bases of the guide elements preferably positioned closely adjacent one another and disposed all the way around the circumferences of the packing cups and the downwardly extending pointed ends of the guide elements preferably depending below lips 18. The guide elements are thus inclined inwardly in accordance with the taper of the lips 18 and their pivoted ends are free to radially yield for guiding the packing cups past any obstruction in the tubing such as may be caused by an indentation shown at 21. The guiding means will also insure the packing cups moving past the joints 22 of the tubing without catching in the joints, and will prevent wearing of the material which forms the packing cups.

The packing as thus described is preferably mounted on the lower portion of mandrel 13, and in order to guide and centrally maintain the upper end of the mandrel in the well piping the mandrel may be provided with a guide collar 23 adjacent its upper end and projecting radially to a point closely adjacent the wall of tubing 10 for maintaining the mandrel substantially concentric therein. The collar 23 is preferably radially recessed as shown at 24 so as to permit free passage of fluid.

The leak indicator as thus described is adapted to be positively forced downwardly through well piping so as to clear any obstruction in its bore and force the incompressible column of fluid outwardly through leak 21 until the indicator is arrested by that portion of the column of fluid standing to the level of the leak, at which point the column of fluid will hold the indicator against further descent and thus permit the leak being accurately located by suitably measuring the distance to which the indicator has descended.

The means for thus positively lowering the indicator may be a usual string of sucker rods shown at 25, which may be connected to mandrel 13 by a usual threaded box 26 at the lower end of the string of rods engaging a cooperating threaded pin 27 which may project from the upper end of the mandrel as shown in Fig. 2. By this arrangement the indicator may be readily lowered through the bore of well piping, and if an obstruction such as an indentation 21 is encountered or if the packing tends to catch at any of the joints 22, a suitable force exerted on the string of sucker rods will move the indicator past any such obstruction and will also continue the downward movement of the indicator when the column of fluid in the tubing is first met, thereby forcing the fluid outwardly through leak 12 and thus assuring positive lowering of the indicator all the way to the level of the leak where it is held by the incompressible column of fluid. If the indicator meets an indentation in the tubing, the guarded lips 18 of its packing cups will tend to guide the indicator past the obstruction as a result of the inclined arrangement of the lips, and the lips 18 will also tend to guide the indicator past the joints of the tubing without the packing catching therein. By providing the wear resisting guards 19 on the lips 18 the packing is protected against wearing action such as would tend to damage it, and at the same time the guiding means 19 is free to yield at any point in its circumference if an appreciable indentation or other obstruction is met. The construction thus assures descent of the indicator all the way to the level of the leak irrespective of what obstructions may be encountered.

It is sometimes desirable that the indicator be allowed to descend of its own weight until arrested by an obstruction or by meeting the column of fluid standing in the tubing, and then be positively continued in its descent through engagement by a string of sucker rods or the like, and for this purpose I may employ the modified construction shown in Figs. 5 and 6. In this construction the indicator is arranged as previously described and the string of sucker rods 25 is connected thereto by a lost motion connection whereby the string of rods may be lowered through the tubing in back of the indicator but in non-engagement therewith until the indicator is arrested in its gravity descent, whereupon the string of sucker rods may be moved into engagement with the indicator for positively continuing its descent. If after passing an obstruction the indicator is again free for descent by its own weight, its lost motion connection with the string of sucker rods again permits the rods to simply follow the indicator downwardly through the tubing without operatively engaging the same, and at the same time the lost motion connection permits the string of rods to be again brought into operative engagement with the indicator for positively lowering it when so desired. The lost motion connection preferably also provides for elevating or withdrawing the indicator.

As an instance of this lost motion connection a collar 30 may be fixed to the upper end of mandrel 13, as for example by a usual pin and socket connection 31—32, and the string of sucker rods 25 may be lowered through the tubing in spaced relation in back of the indicator as long as the latter freely descends by gravity, and the string of rods may be moved into operative abutment against collar 30 for positively forcing the indicator downwardly in the event it becomes stuck in the bore of the tubing. The lost motion connection is shown as a flexible cable 33 fixed to and depending from the string of rods and extending through a bore 34 in collar 30 into a bore 35 in the mandrel 13, and abutment 36 is suitably fixed to the lower end of the cable and is free to slide through the bore in the mandrel but is adapted to engage a shoulder 37 in the bore of collar 30 for limiting withdrawal of the cable. By this arrangement the string of sucker rods may be lowered in back of the indicator and inoperatively spaced therefrom the length of cable 33 as long as the indicator descends freely by gravity, and the indicator may be elevated when so desired by lifting the string of sucker rods so as to engage abutment 36 with shoulder 37. The string of sucker rods is also free for lowering into engagement with collar 30 to positively force the indicator downwardly in the event it becomes stuck, due to the provision of bores 34—35 through which the cable 33 may readily retract as shown in Fig. 6.

The lost motion connection between the mandrel and a positive actuating means such as the string of rods 25 thus maintains a relation between the parts whereby the mandrel is controlled by the actuating means for withdrawing the mandrel or forcing it downwardly past an obstruction, while at the same time permitting gravity descent of the mandrel without it being operatively engaged by the actuating means when so desired.

I have thus provided extremely simple but practical means for insuring descent of the leak indicator to exactly the level of a leak in well tubing or the like, irrespective of any impediment to its descent such as may be caused by the tubing joints or by indentations in the tubing; and with the indicator thus positioned at the level of the leak its location may be accurately determined by suitably measuring the distance to which it has descended, as for example by counting the lengths of the string of sucker rods connected to the indicator and lowered in the bore in back of the same. With the leak thus accurately located the piping may be rapidly withdrawn for necessary repairs until the ascertained location of the leak has been reached.

The improved construction also provides for controlling descent of the indicator so that it may be lowered by gravity as far as possible and then positively forced downwardly past any obstruction and to its arrested position at the level of a leak, with the packing providing a fluid tight engagement in the bore of the well piping but adapted to readily yield for passing an obstruction without catching thereon, and the engagement of the packing with the wall of the bore being protected by a wear-resisting medium which is adapted to guide the packing past impediments and readily yield when an appreciable obstruction is met.

What I claim is:—

1. Means for locating a leak in piping, comprising an elongated closure plug adapted for movement through one end of the piping until arrested in alinement with the leak by an incompressible column of fluid filling the piping between its opposite end and the said leak, and an elongated operating device comprising a compression string adapted for insertion in the piping back of the closure plug and having means for engagement or non-engagement with the closure plug, the said engagement of the operating device with the closure plug providing for positively forcing the closure plug through the piping.

2. Means for locating a leak in piping, comprising a closure plug adapted for movement through one end of the piping until arrested in alinement with the leak by an incompressible column of fluid filling the piping between its opposite end and the said leak, an elongated operating device adapted for insertion in the piping in back of the closure plug, and a lost motion connection between the operating device and the closure plug adapted for engagement or non-engagement of the operating device with the closure plug, the said engagement of the operating device with the closure plug providing for positively forcing the closure plug through the piping.

3. Means for locating leaks in well piping comprising a movable closure means adapted to be inserted within the piping and to make liquid tight contact therewith under the pressure of liquid in the piping, a string adapted to be lowered in the piping in back of the closure means, and a lost motion connection between the string and the closure means adapted for engagement or non-engagement of the string with the closure means, the said engagement of the string with the closure means providing for forcing it downwardly through the piping past any obstruction and until arrested in alinement with the leak by a column of fluid standing in the piping to the level of the leak.

4. A closure plug adapted for insertion in piping, an elongated operating device, a connection between the plug and said operating device adapted for retraction in said plug to permit engagement of the plug by the operating device for forcing the plug through the piping, the said connection being adapted for withdrawal from the plug to non-engageably space the operating device from the plug, and means for limiting said withdrawal of the connection from the plug.

5. A closure plug adapted for insertion in well tubing and having a bore, a collar adapted for mounting on the plug and having a bore alining with the plug bore and provided with a shoulder, and a flexible member having an abutment slidable in said bores and adapted to engage said shoulder for limiting withdrawal of the flexible member, the projecting end of said flexible member being adapted for connection to a string or the like.

In witness that I claim the foregoing I have hereunto subscribed my name this 8th day of June, 1928.

PAUL H. GRANGER.